United States Patent [19]
Sass et al.

[11] Patent Number: 6,100,923
[45] Date of Patent: Aug. 8, 2000

[54] METHOD OF INFRARED IMAGING

[75] Inventors: David T. Sass, Macomb County; Joseph D. White, Genesee County, both of Mich.

[73] Assignee: The United States of America as represented by the Secretary of the Army, Washington, D.C.

[21] Appl. No.: 08/821,614

[22] Filed: Mar. 20, 1997

[51] Int. Cl.[7] .................................................. H04N 7/18
[52] U.S. Cl. ............................................. 348/94; 348/207
[58] Field of Search .................................. 348/36–38, 40, 348/86, 91, 92, 94, 95, 129, 136, 207; 382/104, 154; H04N 7/18

[56] References Cited

U.S. PATENT DOCUMENTS

| | | | |
|---|---|---|---|
| 3,735,036 | 5/1973 | Macovski | 348/129 |
| 3,801,957 | 4/1974 | Hogan | 382/104 |
| 3,828,126 | 8/1974 | Ramsey, Jr. | 348/40 |
| 4,745,469 | 5/1988 | Waldecker et al. | 348/94 |
| 4,970,597 | 11/1990 | Shepard | 348/207 |
| 5,206,720 | 4/1993 | Clothiaux et al. | 348/95 |
| 5,687,249 | 11/1997 | Kato | 382/104 |
| 5,731,870 | 3/1998 | Bartko et al. | 348/136 |

*Primary Examiner*—Richard Lee
*Attorney, Agent, or Firm*—David L. Kuhn; Peter A. Taucher

[57] ABSTRACT

The method herein images an object repeatedly moving about an axis. The method uses signals to track the object's position with respect to the axis while a camera views the object. A reflection is cast from the object toward the camera in such a way that the camera scans both the reflection and the object. The camera outputs representations of video lines, which depict parts of the object and the reflection. These video lines have known positions relative to a reference plane, which passes through the image plane of the camera. Certain of the video lines are selected. The selected lines come from a chosen position relative to the reference plane and occur within a chosen time of the position signals. The selected video lines are arrayed according to their particular position signals and are used to compile a planar composite image representing the object's outer periphery. The composite image is conformed to a shape resembling the periphery, thereby creating a three dimensional representation of the object.

6 Claims, 4 Drawing Sheets

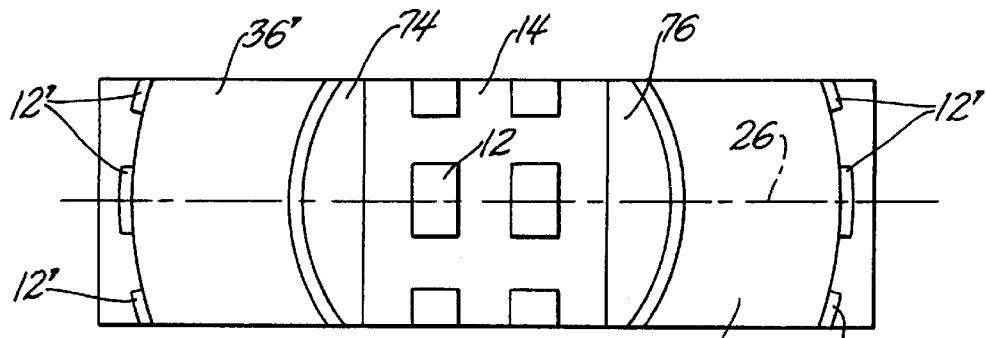
Fig. 3
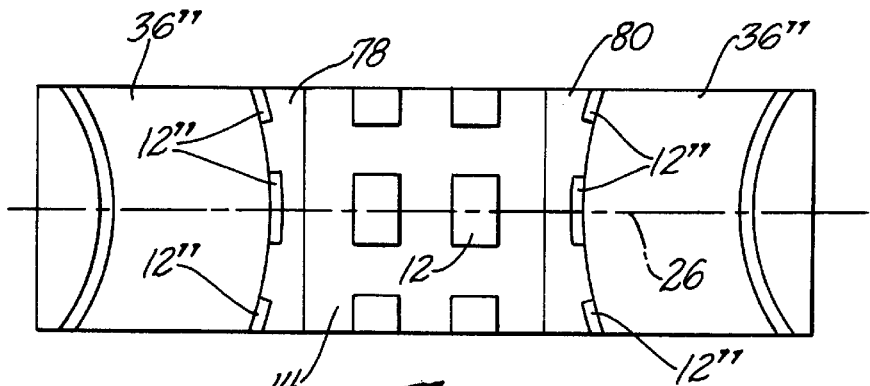
Fig. 4
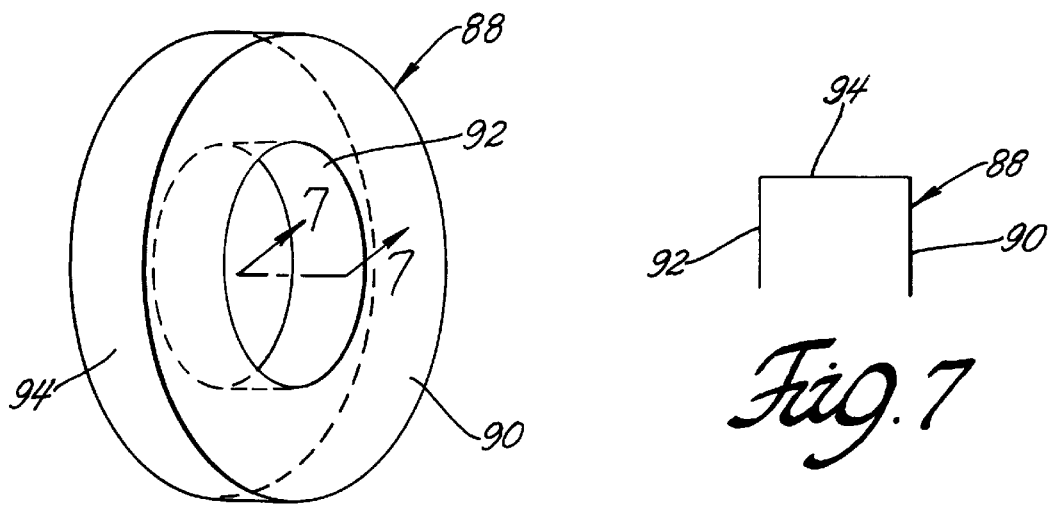
Fig. 6
Fig. 7

METHOD OF INFRARED IMAGING

GOVERNMENT USE

The invention described here may be made, used and licensed by or for the U.S. Government for governmental purposes without paying us royalty.

BACKGROUND

Our method constructs composite images of outer surfaces of spinning or looping objects. We use standard, relatively inexpensive, commercially available video processing equipment. We build upon and modify the basic method of U.S. Pat. No. 4,970,597 to Shepard entitled "Method to Image High Speed Events Using A Standard Video Camera," which constructs composite images of high speed events.

In U.S. Pat. No. 4,970,597, a series of individual video camera line signals are selected from video frames imaging recurrences of a repeating event. U.S. Pat. No. 4,970,597 uses an aperture signal 36 whose signal points 38 occur a predetermined time before a video camera line signal begins. A flagging signal 32 occurs a constant time "c" before each recurrence of the event. In essence, the temporal juxtaposition of flagging signal 32 and a signal point 38 indicate how close in time the recurrence is to the onset of a camera video line signal. If the recurrence is close enough to the onset of the line signal, then the line signal is used in constructing a composite image of the event.

Instead of a flagging signal, we use rotational position signals generated by a shaft encoder. Each rotational position signal corresponds to one of a multiplicity of known angular positions of a spinning object such as a tire. Each rotational signal can be regarded as an indicator of a recurrence of an event, which is the spinning object's arrival at one of its known angular positions. If the event occurs within a selected time of the beginning of a given video line signal from a camera, then the given line signal is a candidate for use in construction of a composite image of the spinning object. The given line must meet further criteria of our method before it is used for the composite image.

SUMMARY

Our method images an object undergoing repeated circulatory motion about one or more axes, or an object spinning about a single axis. Our method uses signals to track the object's position with respect to an axis as a camera scans the object. Mirrors cast reflections from the object toward the camera so that the camera scans both the reflections and the object, the reflections being different views of the object than the camera's view. The camera sends out signals representing either horizontal or scan video lines which depict parts of the object and parts of the reflections, the video lines having known positions relative to a reference plane. Given horizontal or scan video lines are of interest if they come from a chosen position relative to the reference plane and occur within a selected time of a position signal. The lines of interest are given identifiers corresponding to the particular position signal they are nearest to. The lines of interest are arranged in an array according to their particular position signals and are used to compile a flat composite image of the object's outer periphery. The composite image is then graphically wrapped or computer mapped onto a shape resembling the object's outer surface, thereby producing an image which can be viewed from any angle.

BRIEF DESCRIPTION OF THE DRAWINGS

FIG. 3 is a view of the tire as seen by the camera.

FIG. 4 is the view of FIG. 3 wherein images of the reflections have been reversed.

FIG. 6 is a perspective view of a shape onto which the composite image of FIG. 5 is wrapped.

FIG. 7 is a view along line 7—7 in FIG. 6 representing a cross section of the FIG. 6 shape.

DETAILED DESCRIPTION

Figure 1:
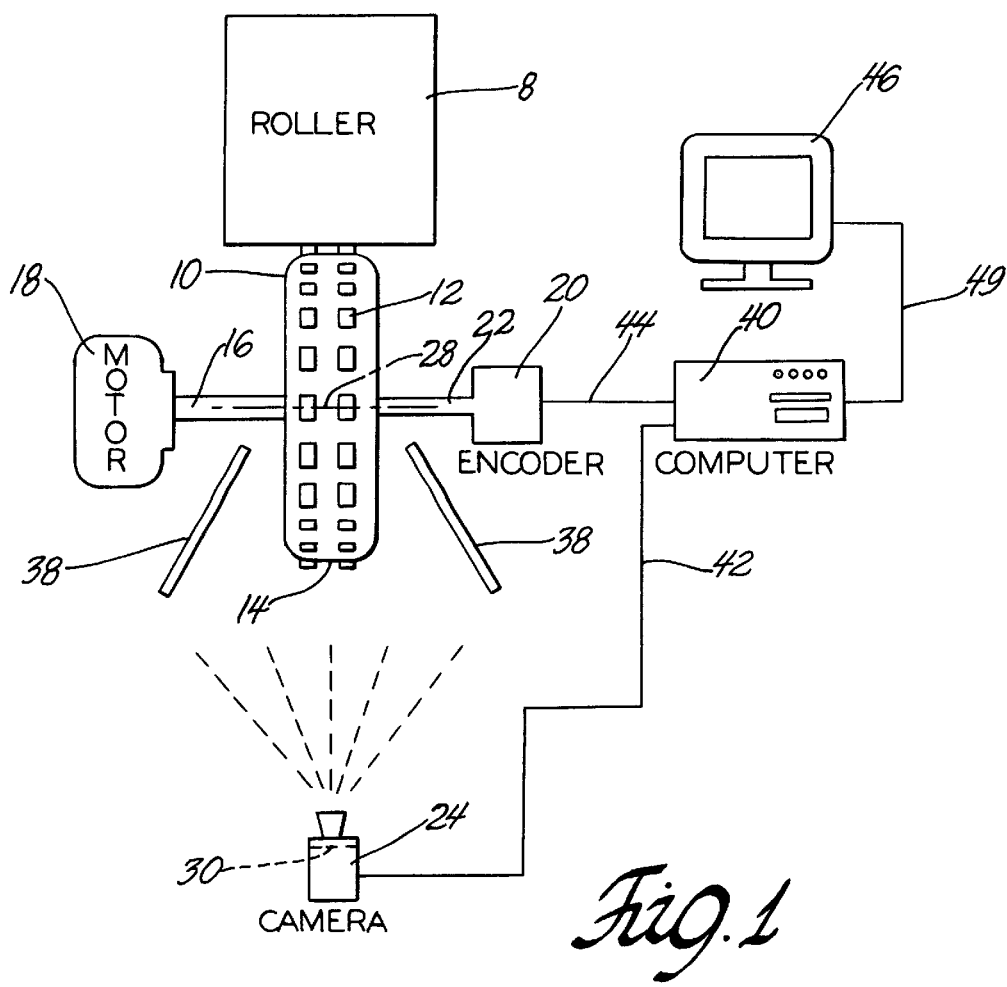
FIG. 1 is a semi-schematic depiction of the apparatus used in our method.

FIG. 1 is a semi-schematic diagram of an apparatus to take a 360° image of the entire outer periphery of an object such as a tire 10 spinning about a single axis 28. Optionally, the apparatus can image a sector of tire 10, or can image any object that orbits about an axis. The apparatus can also image entire drive belts or chains, segments thereof, or any objects which have a plurality of axes around which they loop in a closed path. Additionally, the apparatus can image continuous moving stock of items such as paper or cable during a manufacturing process.

Tire 10 may have knobs 12 or any manner of tread on its outer diametrical surface 14. Tire 10 mounts on axle 16, which spins at a speed controlled by motor 18. Shaft encoder 20 senses the rotational position of tire 10 and outputs a signal representing that position. In our apparatus, shaft encoder 20 sends a signal at each of 1024 equal angular divisions corresponding to positions of tire 10 relative to axis 28. Shaft encoder 20 is connected to tire 10 by a speedometer cable 22 or the like or can be connected to tire 10 by a rigid shaft axially aligned with axle 16. Tire 10 bears on roller 8 with a pressure like that of a tire supporting a vehicle on the ground, and roller 8 spins with tire 10. Tire 10 can rotate at speeds typical of vehicle travel, so the tire's contact with roller 8 creates heat patterns in the tire like those produced by highway travel.

Figure 2:
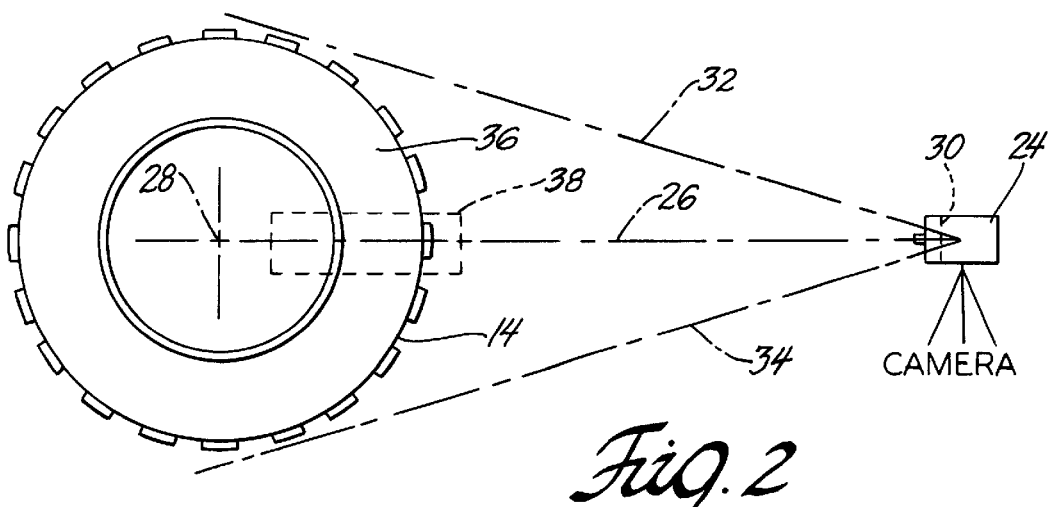
FIG. 2 is shows the juxtapositions of reference planes to tire and a camera viewing the tire.
Figure 15:
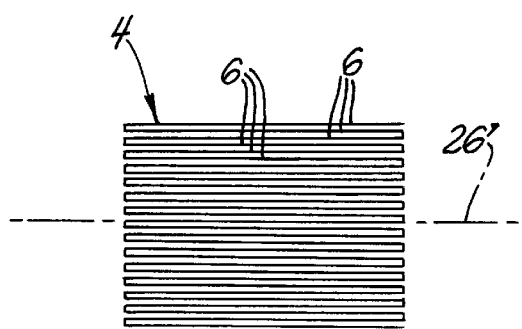
FIG. 15 illustrates the raster pattern of the camera.

Referring now to FIGS. 1 and 2, Infrared camera 24 aims at tire 10 so as to get a direct view of surface 14. We contemplate that camera 24 will normally be essentially the same, and will normally operate in essentially the same way, as the camera used by Shepard in U.S. Pat. No. 4,970,597, discussed previously. Camera 24 has a raster pattern 4 comprising a set of parallel lines 6, as seen in FIG. 15. Camera 24 is oriented so that the raster pattern intersects a reference plane 26 and so that individual lines of the raster pattern are parallel both to reference plane 26 and to tire axis 28. Camera 24 may also be a staring mode camera simultaneously producing a multiplicity of horizontal video lines, wherein plane 26 intersects the focal plane array of the camera.

Reference plane 26 may be regarded as intersecting the cameras's image or focal plane 30, which is represented by a dashed line. In FIG. 2, reference plane 26 is a horizontal plane passing through tire axis 28. However, reference planes can be at other orientations. For example, reference planes 32 and 34 pass through image plane 30, are parallel to axis 28 and are tangent to the radially most outward part of the tire. It is preferred to aim camera 24 directly at tire 10, so that camera 24 aims along plane 26 toward axis 28.

At either side of tire 10 and opposing its sidewalls 36 are stationary flat mirrors 38, which reflect images of the sidewalls to camera 24. Mirrors 38 are shown in dashed lines in FIG. 2. The function of mirrors 38 is to provide added views of tire 10 taken from different vantage points, the added views ultimately going to the same frame grabber as the view of tire 10 seen directly by camera 24. The added views can be gotten by means other than flat mirrors 38, as by auxiliary cameras aimed at sidewalls 36 or by curved mirrors. However, flat mirrors 38 are preferred.

FIG. 3 shows a view from the vantage point of camera 24 looking along plane 26, where the view includes part of the tire's outer diametrical surface 14, reflected images 36' of sidewalls 36 and reflected side views 12' of knobs 12. In conventional fashion, camera 24 scans lines of the view represented by FIG. 3 as the camera executes its raster pattern. Video signals representing these scan lines are sent to computer 40 (FIG. 1) along communication line 42. Alternately, video signals representing horizontal lines from a staring mode camera are sent along line 42. As line signals are sent along line 42, signals from shaft encoder 20, which represent the tire's rotational position, are sent to computer 40 along communication line 44. After various signal processing operations, computer 40 can send images to monitor 46 along communication line 49 or can store the images internally.

Figure 8:
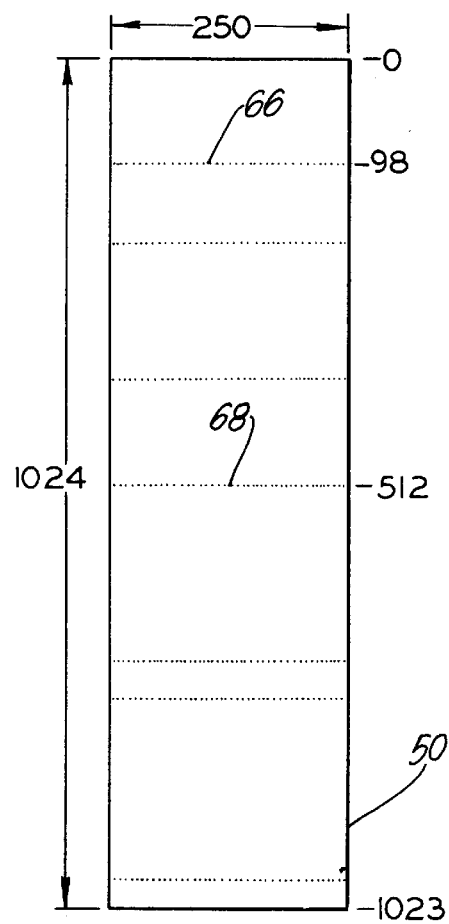
FIG. 8 represents the larger of two computer memory arrays used in our method.
Figure 9:
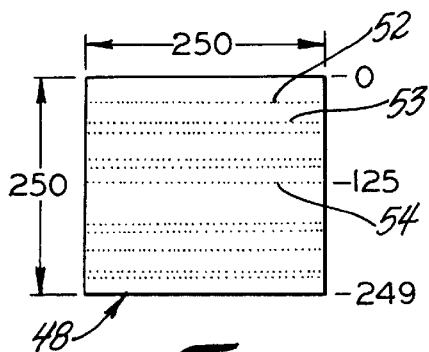
FIG. 9 represents the smaller of two computer memory arrays used in our method.

Computer 40 has a conventional frame grabber whose data storage buffer or array 48 is represented by FIG. 9. Array 48 holds one video frame from camera 24. Also within computer 40 is a memory storage having buffer or array 50 communicated to array 48 and represented by FIG. 8. Array 48, the smaller of the two arrays, stores signals from camera 24 representing a multiplicity of horizontal lines or scan lines. The horizontal line or scan line data is represented by dotted lines such as those seen at 52 and 53 in FIG. 9. The particular array represented by FIG. 9 is a 250×250 array, which means that each dotted line represents a scan line that is 250 pixels long and that 250 scan lines are represented. The horizontal or scan lines are each assigned a unique sequential identifier number, which ranges from 0 to 249 and which represents a unique position within the raster pattern of camera 24. The first horizontal or scan line is at the top of FIG. 9 and is assigned the "0" identity number and the last line is at the bottom of FIG. 9 and is assigned the "249" identity number.

At any given instant, camera 24 views only a sector of tire 10. Hence array 48 shows only the sector of the tire in the frame imaged by the camera as the frame grabber captures the frame. In order to build a composite image of the whole tire 10, we use selected lines from numerous frames captured at different instants, until sufficient lines have been acquired to build the composite image. The selected lines are moved from array 48 to the larger array 50. We prefer array 50 to be larger than array 48 so that array 50 can store sufficient data to represent all of tire 10 with the quality of resolution that we desire.

It is, of course, possible for horizontal or scan lines to be taken directly from camera 24 to array 50, thereby eliminating the need for array 48. However, for the particular camera used in developing our method, taking lines directly from the camera would require modifying the rather complex program logic by which the camera operates. It was deemed more convenient to utilize array 48 than to modify the camera's program logic.

As seen in FIG. 8, array 50 is a 250 by 1024 array where dotted lines represent horizontal or scan lines 250 pixels long, array 50 holding 1024 such lines. Each line in array 50 is in an array position associated with one of the 1024 rotational positions of tire 10 sensed by shaft encoder 20. As lines are transferred from array 48 to array 50, they are renumbered or re-indexed. That is, lines stored in array 48 will have been numbered from 0 to 249, but are given a new number or other identifier corresponding to the appropriate rotational position signal from shaft encoder 20. These lines are placed in array 50 in accordance with their new number, so that a line with new number 726, for example, enters array 50 at a location associated with rotational position 726.

Figure 10:
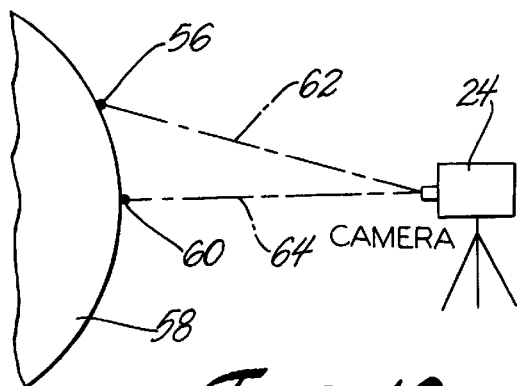
FIG. 10 illustrates the effect of using multiple viewing angles under our method.

In selecting lines from array 48 for transfer to array 50, we prefer to take lines from only one position in array 48. In this way, we avoid lines representing portions of tire 10 that are at different distances from camera 24 or that are along different angles from camera 24. The problem is illustrated in exaggerated fashion in FIG. 10, where a line taken of location 56 on round object 58 is at a different distance than location 60 from camera 24. Location 56 is along a line of sight 62 and location 60 is along line of sight 64, and these lines of sight are at a different angles with respect to camera 24.

In our method, any selected line will normally be one that is most centrally located in array 48 or the raster pattern of camera 24, as is line 54 at array position 125 in FIG. 9. Line 54 will either be in reference plane 26 or will be the closest horizontal or scan line to reference plane 26. Thus line 54 represents an available view taken most nearly perpendicular to the tire's outer diametrical surface 14. Optionally, line 54 can be in any array position between 0 and 249 in FIG. 9 and can be in any reference plane between planes 32 and 34 in FIG. 2.

The selected lines must have a predefined temporal closeness to a rotational position signal. To achieve temporal closeness in our method, the selected lines begin within a chosen time span of a rotational position signal from shaft encoder 20. The time span chosen generally shortens at increasing angular speeds of tire 10 or when higher image quality is desired. A line which has the proper array position and is temporally close enough to the rotational position signal is deemed a "line of interest" within a frame imaged by camera 24.

Frames representing sectors are of tire 10 are continuously captured and lines of interest are continually selected and sent to array 50. In FIG. 8, for example, lines of interest 66 and 68 are at respective array locations 98 and 512. The processes of capturing and selecting continue until at least a given number, n, of lines has been sent to each of the 1024 positions in array 50. Frames not containing lines of interest are disregarded.

Taking place at each array location is a determination of averages for each pixel location in the selected lines. A number of averaging techniques can be used but we prefer to use a moving weighted average calculated according to the formula:

$$X_{mwa} = X_1(\tfrac{1}{2})^{n-1} + X_2(\tfrac{1}{2})^{n-1} + X_3(\tfrac{1}{2})^{n-2} + X_4(\tfrac{1}{2})^{n-3} + X_5(\tfrac{1}{2})^{n-4} \ldots + X_n(\tfrac{1}{2})^{n-}$$

where $X_{mwa}$ is the moving weighted average for the pixel location, $X_1, X_2, X_3 \ldots X_n$ are respectively the first, second, third and nth pixel values sent to the pixel location. For a plurality of pixel values, the formula gives the last received value a 50% weight and all previous values combined receive a 50% weight. By this method of calculating an average, the most current data has the greatest effect on the average. In addition, this method of average calculation uses less memory capacity and permits faster image processing than other methods.

In our method, the images 36' of sidewalls 36, as well as the images 12' of knobs 12, are reversed. The reversal can be such that image 36' on the left side of FIG. 3 is turned on its axis to become the reversed sidewall image 36" on the left side of FIG. 4; and similarly, image 36' on the right side of FIG. 3 is turned on its axis to become the reversed sidewall image 36" on the right side of FIG. 4. Images 12' of knobs 12 become images 12". The reversal can be done by appropriate lenses or mirrors optically between sidewalls 36 and camera 24. Alternatively, standard image processing techniques can be used, such as reversing portions of horizontal lines or scan lines representing sidewalls 36. Particularly, if horizontal or scan lines from only one position in array 48 are sent to array 50, then the scan line reversal technique explained below can be used.

Figure 11:
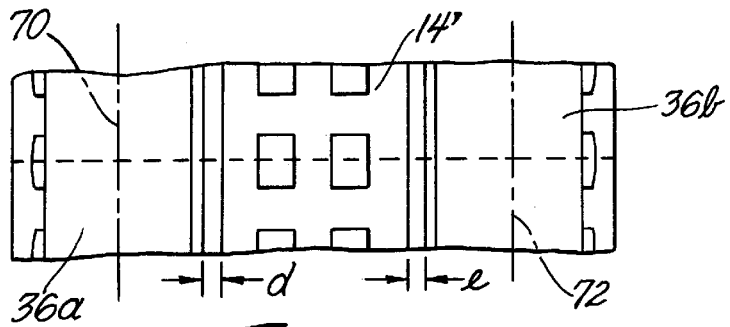
FIG. 11 represents an image of the tire compiled from the camera's horizonal or scan video lines taken from a single position relative a reference plane.

FIG. 11 is a portion of the composite view of tire 10 that would held in array 50 if lines from only one array position in array 48 were sent to array 50. One effect of using lines from only one of array 48's positions is that sidewall images 36a in FIG. 11 are straight and not curved as the analogous sidewall images 36' in FIG. 3. Image 36a is reversed about center line 70, which bisects image 36a, and image 36b is reversed about center line 72, which bisects image 36b. The resulting sidewall images are shown respectively at 36a' and 36b' in FIG. 12.

Figure 12:
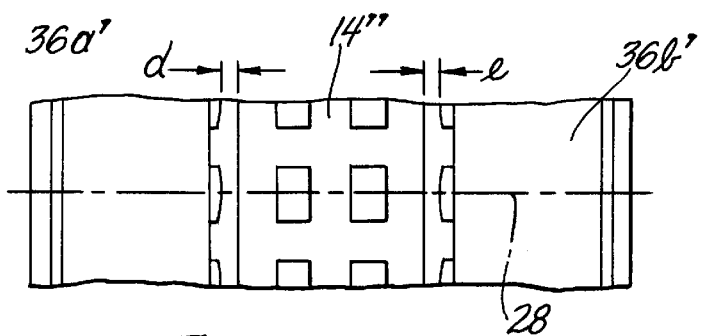
FIG. 12 is the image of FIG. 11 wherein images of the reflections have been reversed.

At least in some instances, there will be gaps between images of the tire's outer diametrical surface and images of the tire's sidewalls. Straight gaps of dimensions "d" and "e" are in FIGS. 11 and 12 and other gaps are at 74 and 76 in FIG. 3 and at 78 and 80 in FIG. 4. In FIG. 12, known image processing techniques can be used to eliminate the gaps of dimensions "d" and "e." This is done, for example, by indexing pixels of images 36a' and 36b' along axis 28 until these images abut image 14" of the tire's outer diametrical surface 14. The pixels of image 36a' all index the same amount and the pixels of image 36b' all index the same amount. In FIG. 4, a somewhat similar operation can be done, but pixels of images 36" index according to their scan lines' vertical distance from reference plane 26, pixels of the vertically more distant lines indexing further horizontally. Images 36" of the sidewall are straightened, and will thus exhibit the general configuration of images 36a' and 36b'. Images 36" will be in abutting line contact with the image of outer diametrical surface 14.

Figure 5:
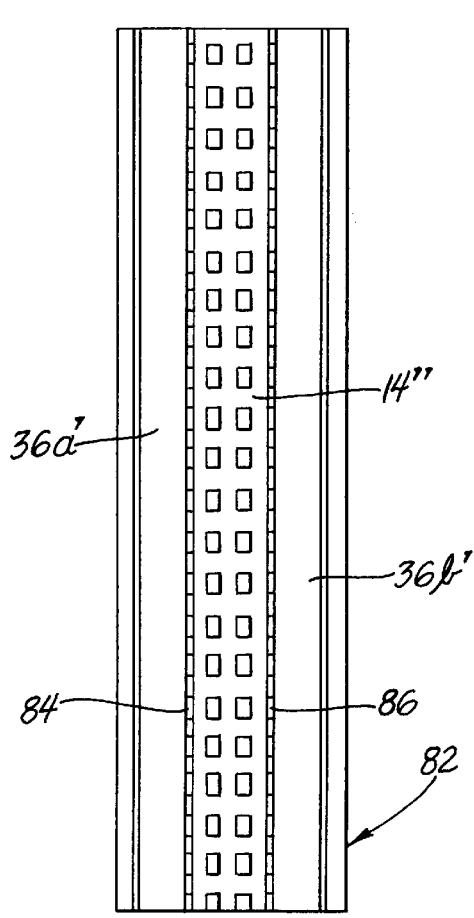
FIG. 5 represents a planar composite image of the tire produced by our process.

After removal of gaps between images shown in either FIG. 12 or FIG. 4, the composite image 82 of the entire outer peripheral surface of tire 10 will appear as the planar strip shown in FIG. 5. Lines 84 and 86 are at the boundaries between image 14" of the tire's outer diametrical surface 14 and images 36a' and 36b' of the tire's sidewalls 36.

The next step in our method is to wrap composite image 82 onto a three dimensional annular shape such as that shown at 88 in FIG. 6 so as to produce a three dimensional representation of tire 10. This operation is done by the use of commercially available software. In developing our method, we used SIMPLY 3D™ software produced by Visual Software, Inc.

Figure 13:
FIG. 13 represents an alternative to the FIG. 7 cross section.

Shape 88 comprises two flat ring-like surfaces 90 and 92 joined at their outer diameters by cylindrical surface 94, so that shape 88 has the rectangular "U" cross section shown in FIG. 7. Shape 88 may be replaced by another three dimensional shape 96 having the radial cross section shown in FIG. 13, shape 96 more nearly representing the cross section of tire 10. For purposes of illustration surfaces 90, 92 and 94 are shown in FIG. 6 with arbitrary, different hatching, but shape 88 can be represented by a wire frame diagram as well.

Figure 14:
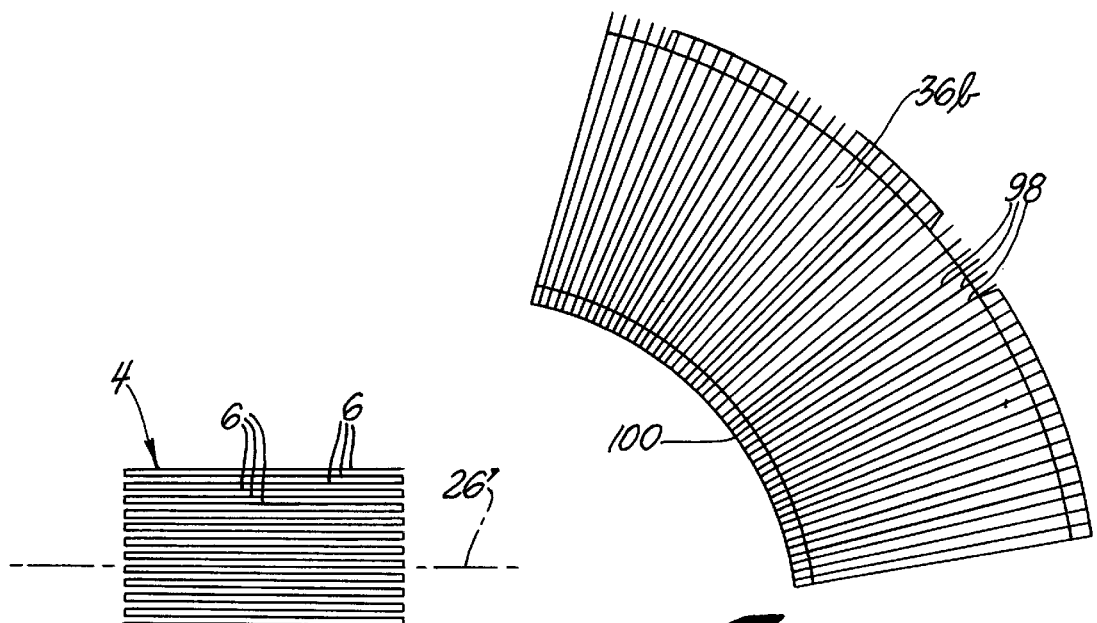
FIG. 14 represents a portion of the composite image depicting a part of the tire sidewall.

FIG. 14 shows a portion of image 36b' after composite image 82 has been wrapped on shape 88. The image will be comprised of processed scan line portions 98 which converge as they approach inner diametrical edge 100. The software used to wrap image 82 onto shape 88 adjusts for the image intensifying effect of line convergence so that the portions of image 36b' nearer edge 100 do not appear unduly bright.

We wish it to be understood that we do not desire to be limited to the exact details of construction or method shown herein since obvious modifications will occur to those skilled in the relevant arts without departing from the spirit and scope of the following claims.

What is claimed is:

1. A method of forming a three-dimensional image of an object moving around at least one axis, comprising:

producing position signals indicating positions of the object relative to the axis;

aiming a camera at the object along a first line sight so that the camera has a first view of the object;

obtaining a second view of the object, the second view taken along a second line of sight generally perpendicular to the first line of sight;

directing the second view to the camera;

wherein the camera sees the first view and the second view, the camera outputting representations of video lines depicting parts of the first view and parts of the second view;

selecting the video lines occurring within predetermined times of the position signals;

indicating the video lines selected with identifiers corresponding to the position signals, wherein each indicated video line is associated with a particular position signal;

using the indicated lines to form a flat composite image representing the object;

providing a three-dimensional shape resembling the object; and folding the composite image onto the shape.

2. The method of claim 1 wherein:

the object comprises a side component and another component connected to the side component;

the first view is a direct view by the camera of the another component; and the second view is an image of the side component, a second view being reflected toward the camera.

3. The method of claim 1 wherein:

the object comprises two side components and another component connecting the side components, a region of one side component being opposed to a region of another side component;

the method further includes obtaining a third view of the object taken along a third line of sight having a generally opposite direction to the second line of sight, and sending the third view to the camera; and each of the views is of a different one of the components.

4. The method of claim 1 wherein:

the camera has an image plane containing the video lines;

selecting the video lines includes picking video lines only from a certain position in the image plane.

5. The method of claim 4 wherein the certain position is the position least distant from a reference plane containing the one axis and lying perpendicular to the image plane of the camera.

6. A method of imaging the entire exterior of an object wherein the object moves around at least one axis, the object having one region encircling the axis and facing radially outward relative to the axis, the method comprising:

producing position signals indicating positions of the object relative to the axis;

aiming a camera along a first line of sight so that the camera has a first view of the object;

obtaining a second view of the object, the second view taken along a second line of sight generally perpendicular to the first line of sight;

directing the second view to the camera;

obtaining a third view of the object taken along a third line of sight having a generally opposite direction to the second line of sight, and sending the third view to the camera;

wherein one of the lines of sight is generally perpendicular to the axis and is aimed toward the one region;

wherein the camera sees the first view and the second view and the third view, the camera outputting representations of video lines depicting parts of the first view and parts of the second view and parts of the third view;

selecting the video lines occurring within predetermined times of the position signals and lying least distant from a reference plane passing both through the axis and an image plane of the camera;

using the selected lines to form a flat composite image representing the object;

providing a three-dimensional shape resembling the object; and folding the composite image onto the shape.

* * * * *